United States Patent [19]

Carmean

[11] Patent Number: 4,761,539
[45] Date of Patent: Aug. 2, 1988

[54] OVEN CALIBRATION SYSTEM HAVING VARIABLE STORED CALIBRATION VALUE

[75] Inventor: Silas E. Carmean, Mansfield, Ohio

[73] Assignee: The Tappan Company, Ohio

[21] Appl. No.: 37,585

[22] Filed: Apr. 13, 1987

[51] Int. Cl.[4] .............................................. H05B 1/02
[52] U.S. Cl. .................................... 219/497; 219/501; 219/413; 219/508; 219/506; 219/494; 324/63; 364/571; 374/1
[58] Field of Search .............. 219/497, 493, 499, 501, 219/210, 494, 508, 506, 10.55 B; 340/365 C, 365 S; 364/571, 510, 178, 179, 573; 324/78 D, 63, 83 D; 374/1

[56] References Cited

U.S. PATENT DOCUMENTS

| | | | |
|---|---|---|---|
| Re. 31,222 | 4/1983 | McCracken | 364/571 |
| 4,195,349 | 3/1980 | Balkanli | 374/143 |
| 4,215,308 | 7/1980 | Kusters | 324/78 D |
| 4,218,916 | 8/1980 | Mutziger | 374/1 |
| 4,246,641 | 1/1981 | Babil et al. | 374/1 |
| 4,313,168 | 1/1982 | Stephens et al. | 364/510 |
| 4,369,352 | 1/1983 | Bowles | 374/1 |

*Primary Examiner*—M. H. Paschall
*Attorney, Agent, or Firm*—Alfred E. Miller

[57] ABSTRACT

In an oven calibration system, a value is stored corresponding to a predetermined temperature, and a calibration value is also stored corresponding to an offset. The calibration value is variable. A temperature sensor produces an output that is compared with a predetermined combination of the stored values. The calibration value may include a fixed increment and a variable multiplier for combination with the fixed increment.

17 Claims, 6 Drawing Sheets

OVEN CALIBRATION SYSTEM HAVING VARIABLE STORED CALIBRATION VALUE

This invention relates to electronic control systems, and is more in particular directed to a calibration system enabling calibration of an apparatus in an interactive manner, While the invention will be disclosed specifically only with respect to a calibration system enabling user calibration of an oven, it will be apparent that the concept of the invention is not so limited, and that the invention is thereby adaptable in other applications.

When a cooking oven is employed for cooking of food in accordance with a given recipe, it is desirable that the user of the oven be able to set the temperature controls of the oven in accordance with the instructions in a recipe. In conventional cooking ovens, it is not possible for the user of the device to modify its calibration, whereby a sufficiently dissatisfied operator must request the services of the vendor or manufacturer of the device for adjusting the calibration thereof. As a matter of fact, it has been found that the majority of requests for service, in devices of this type, is for adjustment of temperature calibration. Such service calls unnecessarily increase costs to both the manufacturer and the purchaser of such cooking devices.

Variations in calibration of such cooking ovens may result from changes in the apparatus, such as, for example, in the thermal sensors, or changes in environment. Apparent miscalculation can also be a result of the operator's tastes, when such tastes differ from those of the preparer of the recipe. Whatever the cause of the problem, however, it is apparent that it would be desirable both economically and from the standpoint of convenience, to simplify the calibration process of an oven so that it can be effected without difficulty by either service personel or untrained operators.

The present invention is therefore directed to the provision of a calibration system and method for overcoming the above discussed problems. The invention is directed to the provision of a method and apparatus readily enabling the calibration of a device employing an interactive control system, with parameters concerning the calibration stored in non-volatile memory.

Briefly stated, in accordance with one embodiment of the invention, an oven is provided having a control system incorporating a microcomputer with a nonvolatile memory. The oven has a display panel enabling the display of the current time, as well as an alphanumeric display for displaying messages. The display panel further includes a number of operating function keys or keypads, and numeric keys or keypads. These keypads may be employed in the conventional manner to control the operation of the oven. In addition, the program of this system enables interactive calibration of the oven, the displays providing instruction messages and the microcomputer being responsive to inputs from the keypads for effecting the calibration.

In a preferred embodiment of the invention there are two calibration modes that can be effected from the control panel by the user or a service technician. The calibration data is stored in non-volatile RAM, and is effected in plus or minus 15 degree Fahrenheit steps. The permissible calibration range extends from 45 degrees Fahrenheit above to 45 degrees Fahrenheit below a "normal" or factory setting.

In the first mode of operation, the user is enabled to determine, by the display, the oven calibration with respect to the original uncalibrated factory setting. This mode is accessed by holding down, for example, the BROIL and DONENESS pads for four or more seconds. The second mode enables the changing of the oven calibration. This mode is accessed, for example, by holding down the PREHEAT BAKE and BAKE pads for four or more consecutive seconds.

In the first mode, for checking oven temperature calibration, the alphanumeric display sequentially displays identification messages including the amount by which calibration had been changed in the past, from the factory setting. The displays may be sequentially: OVEN TEMPERATURE, HAS BEEN, RAISED, FROM THE, ORIGINAL, FACTORY SETTING, and then returning to the current time. At the same time as the message RAISED is displayed, the numerical value is given. Each of the sequential displays is held, for example, for two seconds. If the calibration had been lowered from the factory setting, the label RAISED is, of course, changed to LOWERED. Scanning of displays in this manner is disclosed, for example, in my U.S. Pat. No. 4,568,810.

In the second mode, the alphanumeric display will sequentially display: ADJUST, OVEN TEMPERATURE, IF OVEN IS, NOT HOT ENOUGH, THEN YOU MUST, RAISE, OVEN TEMPERATURE, IF OVEN IS, TOO HOT, THEN YOU MUST, LOWER, OVEN TEMPERATURE, TO RAISE, OVEN TEMPERATURE, TOUCH 9, TO LOWER, OVEN TEMPERATURE, TOUCH 0. 9-UP OR 0-DOWN? Each of these displays appear, for example, for two or four seconds.

If, in response to this message, a 9 has been depressed, the alphanumeric display sequentially displays: OVEN TEMPERATURE, HAS BEEN, RAISED. If, on the other hand, the "0" keypad is depressed, the displays sequentially read OVEN TEMPERATURE, HAS BEEN, LOWERED.

In order that the invention may be more clearly understood, it will now be disclosed in greater detail with reference to the accompanying drawings, wherein.

Figure 1:
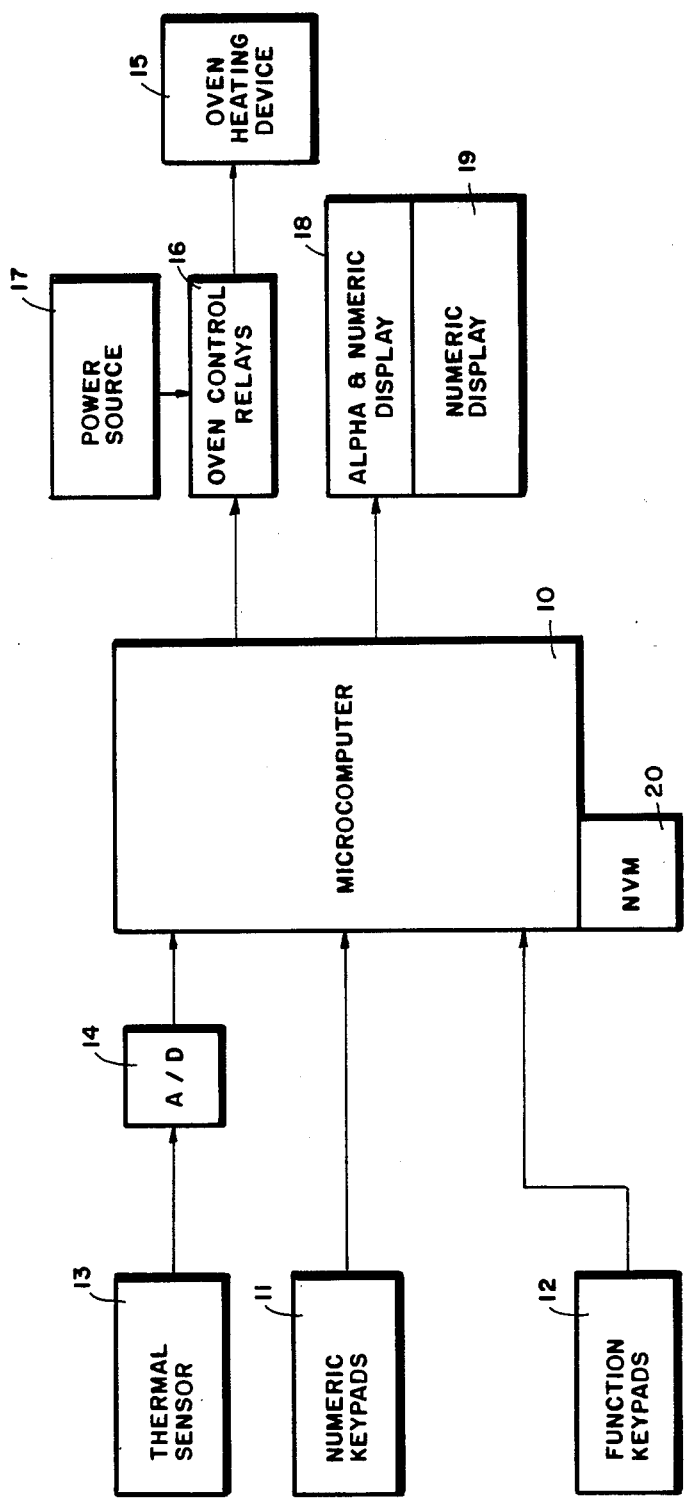
FIG. 1 is a block diagram of an oven control system, in accordance with the invention.

Referring now to the drawings, and more in particular to FIG. 1, therein is illustrated a simplified block diagram of an oven control system, for an oven. The system incorporates a microcomputer 10, adapted to receive input data from numeric keypads 11 and function keypads 12. A thermal sensor 13, for example, a conventional resistance sensing device, is coupled to the microcomputer 10 by way of an analog digital converter 14. The microcomputer controls the operation of the oven heating device 15, for example, the relays of an oven, which in turn control the resistance heating elements of a conventional electric oven. The microcomputer 10 also controls the display on an alphanumeric display 18, as well as the display on a numeric display 19. The numeric display may conventionally constitute a seven segment numeric display that displays the current time, when its other functions are not employed. A system of this type so far described is discussed in my U.S. Pat. No. 4,568,810.

In addition to the above discussed elements, the control system further includes a non-volatile memory in the microcomputer, coupled to the microprocessor therein in the conventional manner.

Figure 2:
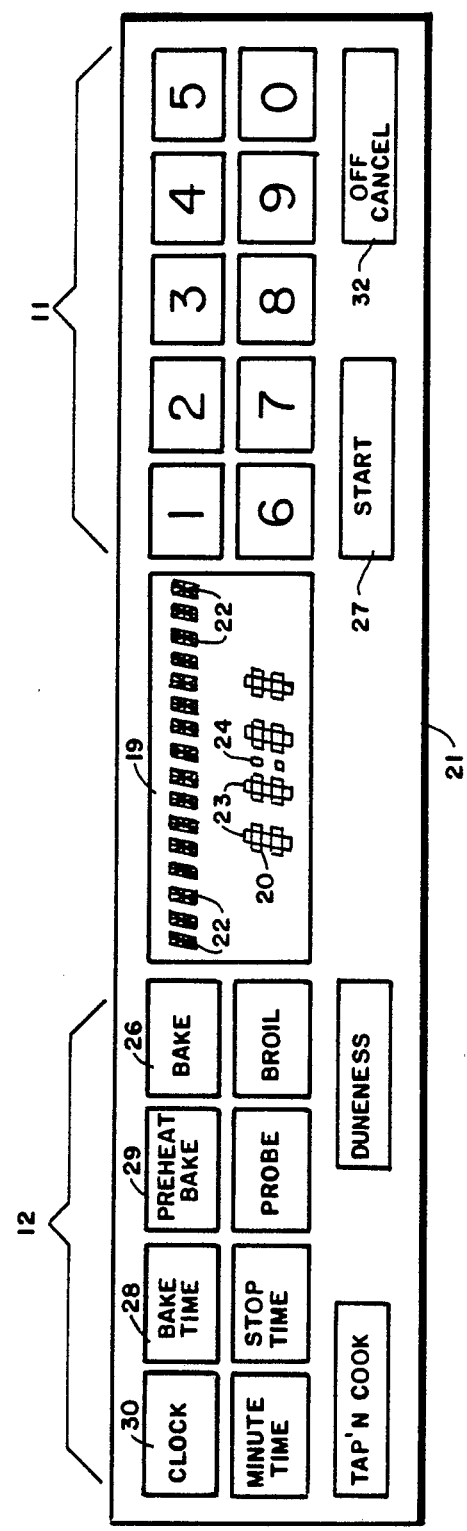
FIG. 2 is a view of a control panel for an oven that may be employed in the system of FIG. 1.

A control panel that may be employed for the oven of FIG. 1 is illustrated in FIG. 2. The control panel 21 includes the numeric key pad 11 having separate Keypads for the numbers 1–0. The alphanumeric display 19 includes a line of alphanumeric display devices 22, for example, 16 such devices. The numeric display 20 comprises a conventional clock display of four seven-segment elements 23 with a central colon 24. Such display devices are well known.

The function keypads 12 serve for controlling the operations of, and programming, the oven. Thus, for example, depression of the BAKE keypad 26 may cause the display of a request for entering temperature in the alphanumeric display 19, with a suggested temperature of 350 degrees displayed on the numeric display 20. If this temperature is satisfactory, depression of the START keypad 27 will result in the energization of the oven to bake at that temperature. Otherwise, the user may enter the desired temperature in the numeric keypads 11. If the start keypad 27 is now depressed, the oven will cook at the newly set temperature.

If, following the entry of the temperature, it is desired to limit the baking time, the BAKE TIME keypad 28 may be depressed, resulting in a request for entry of a baking time. Upon the subsequent depression of the START button 27, the oven will be energized for the preset time. The PREHEAT BAKE keypad 29 functions in a manner similar to that of the BAKE keypad, but instead for a preheating cycle. The CLOCK keypad 30 enables the setting of the clock. The OFF/CANCEL keypad 32 enables termination of a cooking cycle or cancellation of a program. The operation of the oven in accordance with the depression of these keypads is exemplary only, and does not constitute a part of the concept of the present invention. Thus, either more or fewer functions may be provided in the system in accordance with the invention, it only being necessary that a system be provided with means for entering numbers, such as a numeric keypad, and additional entry means for initiating the operation of the calibration modes. Thus, in the following example of the invention, one calibration mode is initiated by the depression of the PREHEAT and BAKE keypads for four seconds or more, and the other mode of the calibration procedure is effected by the depression of the BROIL and DONENESS keypads for four seconds or more. The program of the microcomputer responds to depressions of these keypads for less than four seconds, for effecting their conventional above-described operation, while responding to depressions longer than four seconds for entering the calibration modes for operation.

Figure 3:
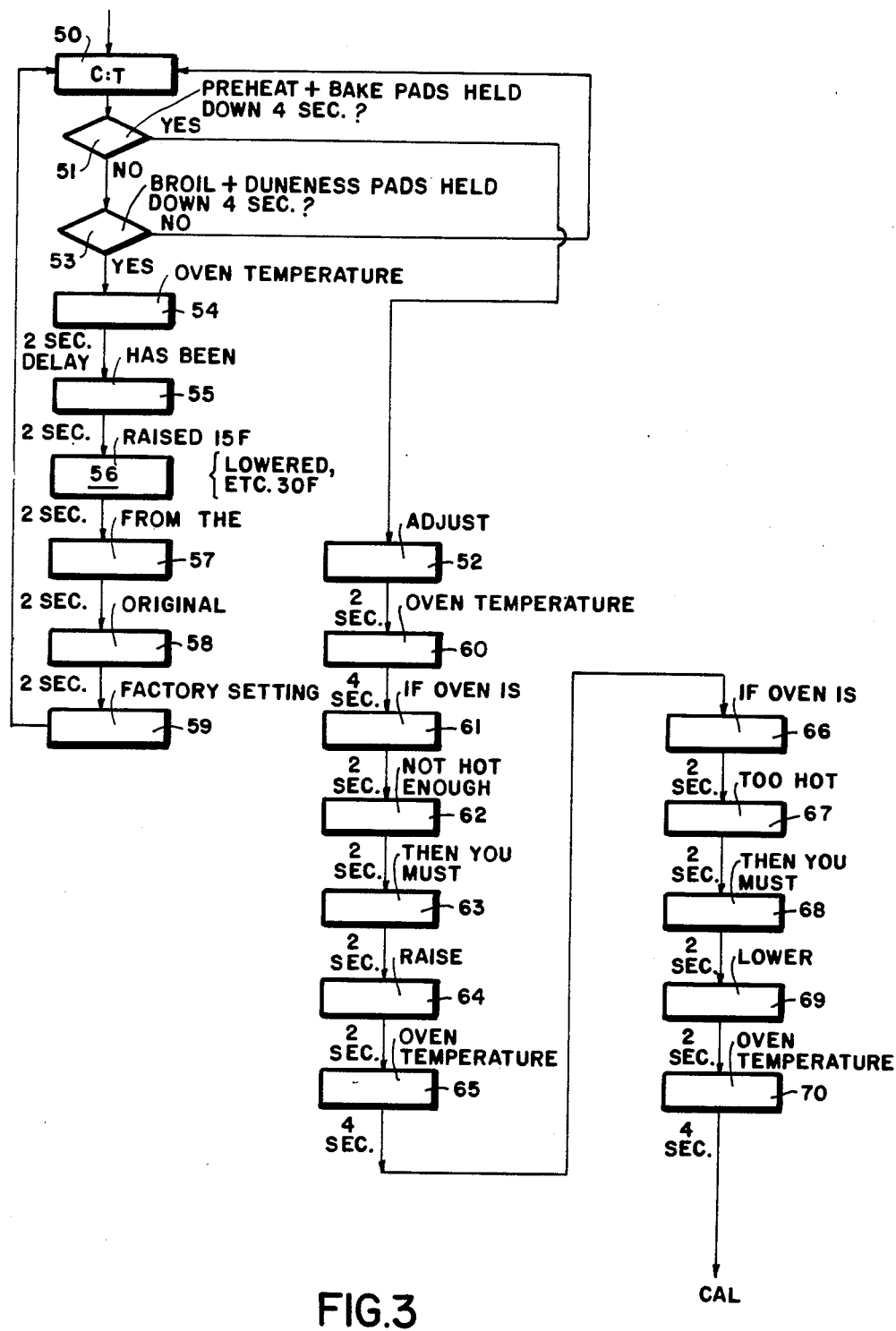
FIG. 3 is a portion of a flow diagram in accordance with the invention.

Referring now to FIG. 3, which illustrates a flow diagram of a calibration procedure in accordance with the invention, unless otherwise noted the rectangular blocks denoting the condition of the display, i.e. the message appearing on the display. Alphanumeric messages appear on the line 19, and temperature reading appear on the numeric display. The indicia "C:T" refers to the display of current time on the numeric display 20.

Initially, as indicated at block 50, the current time is displayed. A test is made at block 51 if the PREHEAT and BAKE pads have been held down four seconds. If it has, the program proceeds to the adjustment procedure, starting at block 52. If not, a test is made at block 53 if the BROIL and DONENESS pads have been held down for four seconds. If it has, the program proceeds to advise the operator of the calibration setting, starting at block 54. Otherwise, the program returns to block 50, to retest the conditions of the above discussed heat pads. It is of course apparent that this loop is illustrated only in simplified form, and includes further tests and procedures in accordance with the conventional operation of the oven.

In the procedure for advising the operator of the calibration of the oven, the alphanumeric display displays sequentially the messages: OVEN TEMPERATURE, HAS BEEN LOWERED (or raised), FROM THE, ORIGINAL, FACTORY SETTING, at two second intervals, thence returning to the block 50. In block 56, the amount that the calibration has been raised or lowered, is displayed in the alphanumeric display 19. The raising or lowering, in the preferred embodiment of the invention, can be effected in 15 degrees Fahrenheit increments from the factory setting of the oven, to a maximum of 45 degrees Fahrenheit from the factory setting. As will be discussed, this increment is stored in non-volatile memory, so that it is not effected by disconnection of the oven, or the like.

This feature, in accordance with the invention, enables the user to be aware of the actual calibration of the oven, and whether or not further correction may be made.

Figure 4:
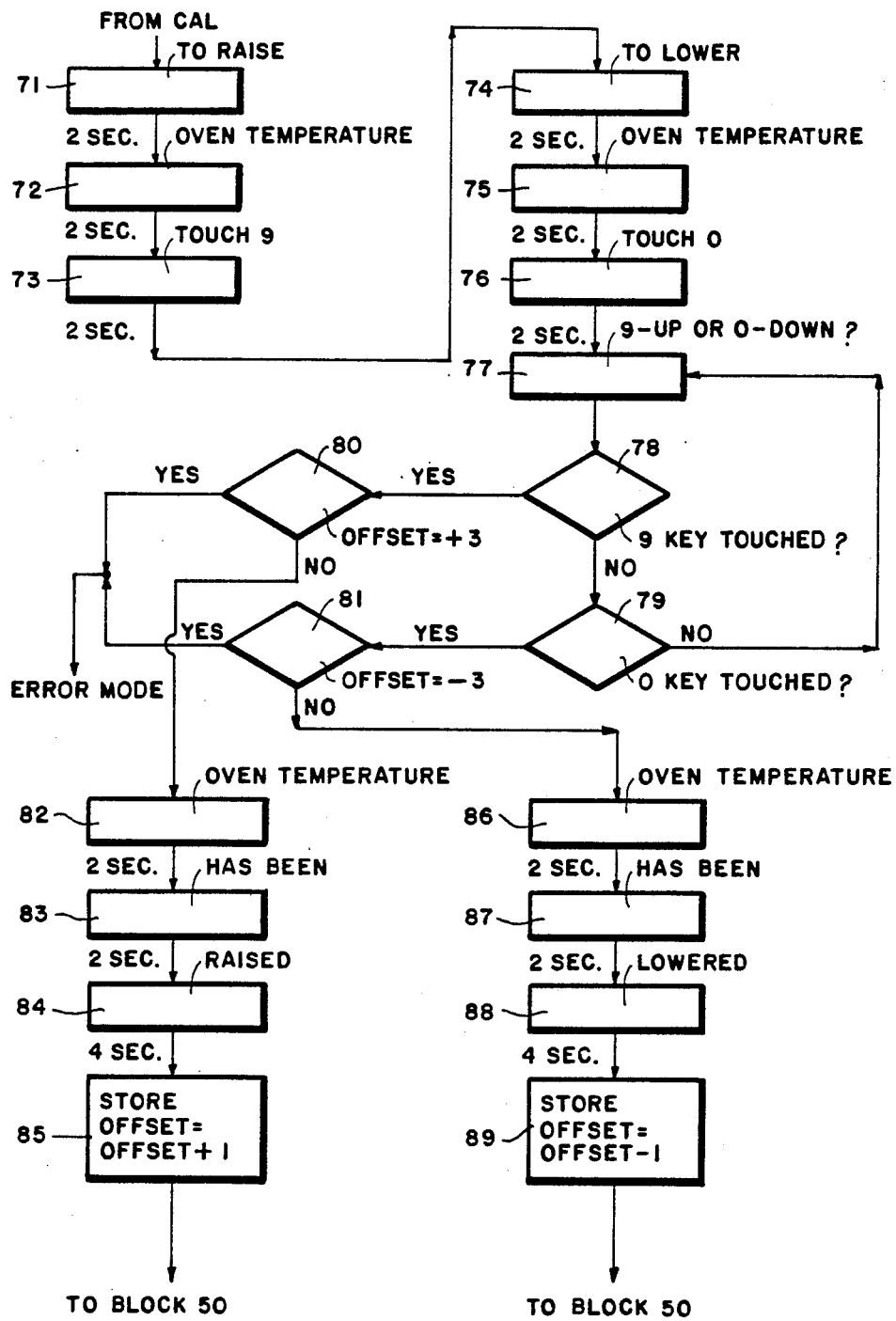
FIG. 4 is a view of a second portion of a flow diagram in accordance with the invention constituting a continuation of the flow diagram of FIG. 1.

Referring to FIGS. 3 and 4, block 71 of FIG. 4 is continuation from block 70 of FIG. 3. The blocks 52 and 60–77 show sequential displays which appear upon the initiation of the adjustment procedure. These displays, on the alphanumeric display, appear for two or four seconds as indicated, and may provide the message ADJUST OVEN TEMPERATURE. IF OVEN IS NOT HOT ENOUGH THEN YOU MUST RAISE OVEN TEMPERATURE. IF OVEN IS TOO HOT THEN YOU MUST LOWER OVEN TEMPERATURE. TO RAISE OVEN TEMPERATURE TOUCH 9. TO LOWER OVEN TEMPERATURE, TOUCH 0. 9-UP OR 0-DOWN?

Upon completion of this display, a test is made at block 78 for the depression of the 9 keypad, and a test is made at block 79 for the depression of the 0 keypad. If either of these keypads is touched, a test is made at blocks 80 and 81, respectively, if the OFFSET is over +3 or under −3, indicating that the maximum OFFSET has been previously set into the calibration. If the OFFSET has previously been set to 3, the program branches to the error mode, which will be discussed with reference to FIG. 5.

If touching of the 9 keypad was detected, the program displays a message: OVEN TEMPERATURE HAS BEEN RAISED, in blocks 82–84, and then proceeds in block 85 to increase the contents of a memory location in non-volatile memory by one, i.e., increasing the OFFSET by one. (The original factory setting of the OFFSET is 0.) If, on the other hand, the touching of the 0 keypad had been detected, the program proceeds to display the message: OVEN TEMPERATURE HAS BEEN LOWERED, at blocks 86–88, and to decrease the OFFSET in non-volatile memory by one, in block 89. (It is noted that blocks 85 and 89 do not correspond to display messages.) After modification of the OFFSET stored in non-volatile memory, the program returns to block 50, and hence the further operations of the oven.

Figure 5:
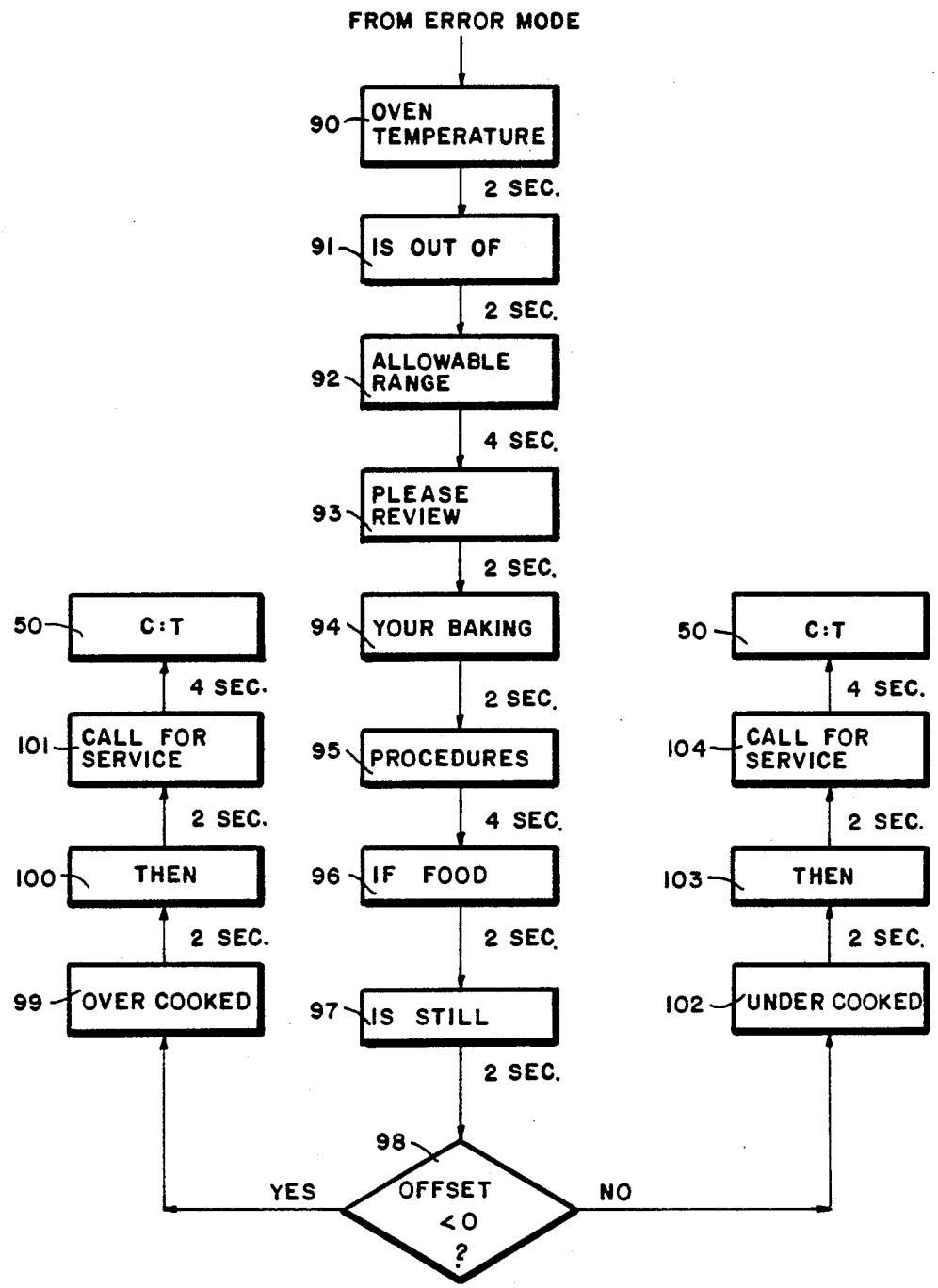
FIG. 5 is a flow diagram of a further continuation of the flow diagram of FIG. 3.

In the event that an error mode had been detected in blocks 80 or 81, indicating that the operator desired to adjust the calibration to an extent greater than permitted, the program jumps to FIG. 5, wherein in blocks 90-97 the alphanumeric display sequentially displays the message OVEN TEMPERATURE IS OUT OF ALLOWABLE RANGE PLEASE REVIEW YOUR BAKING PROCEDURES IF FOOD IS STILL. The program then tests whether the OFFSET is greater or less than 0 at block 98. If the OFFSET is less than 0, the message continues: OVERCOOKED THEN CALL FOR SERVICE, at blocks 99-101, and returns to the main program at block 50. Otherwise, the message UNDERCOOKED, THEN CALL FOR SERVICE is displayed sequentially at blocks 102-104 before returning to the main program at block 50.

Figure 6:
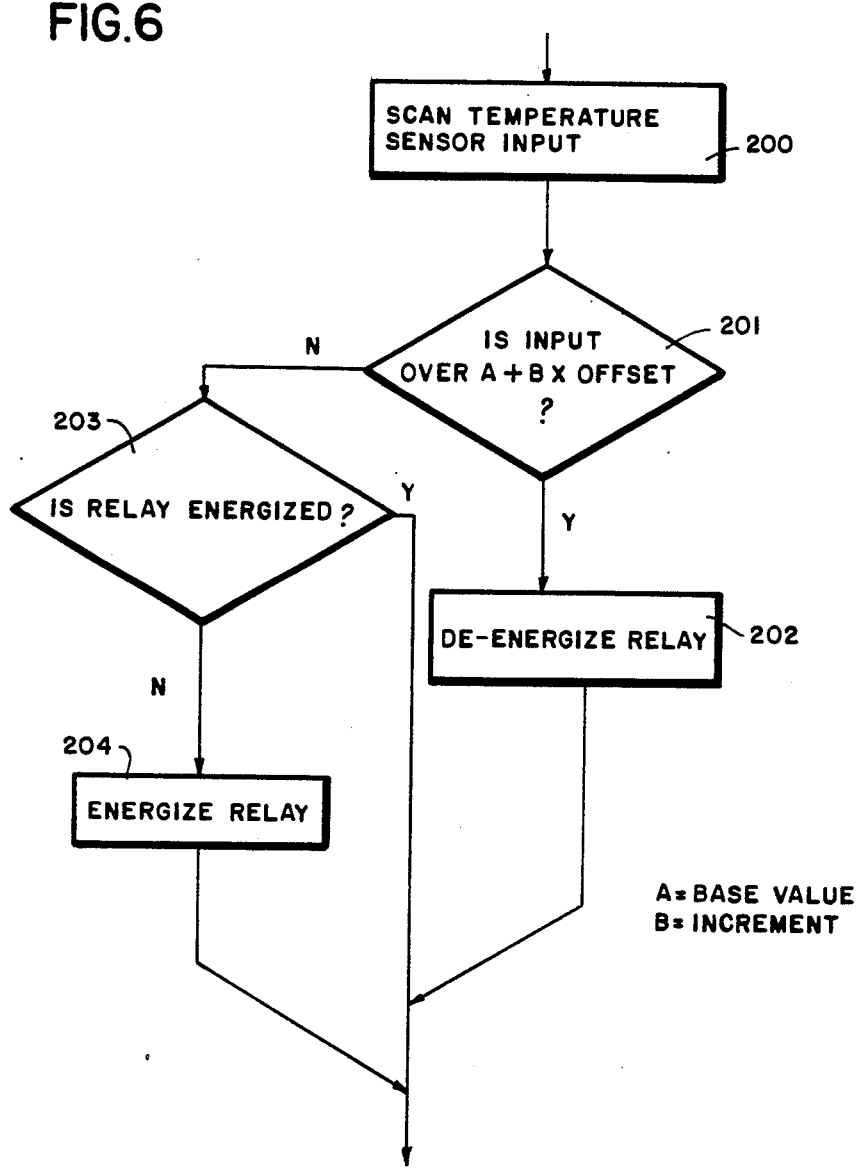
FIG. 6 is a further flow diagram in accordance with the invention.

The messages discussed above are exemplary only, and alternative messages or instructions may be provided in order to enable the operator to interact with the system, to effect the adjustment of the temperature in a simple manner. In the use of the oven, the OFFSET stored in the non-volatile memory is employed as a factor in the determination of whether or not the oven has become heated to the desired extent. For example, as illustrated in FIG. 6, during a cooking procedure, the input from the temperature sensing device is sensed at block 200. This input is in digital form, as discussed above. The calibration curve of the sensor may be stored in non-volatile memory if desired. At block 201 a test is made if the sensor input is greater than the quantity A plus B times OFFSET, wherein A is a base value, i.e. the factory setting value, B is an OFFSET value corresponding to the adjustment required for a 15 degree change in temperature, and the OFFSET is the numerical value of the OFFSET set in non-volatile memory as above discussed. If the input exceeds this quantity, the relay or other oven heating device is deenergized at block 202. Otherwise, a test is made at block 203 if the oven heating device is energized. If it is not, it is energized at block 204. The program then returns to the background program of the microcomputer, before returning to this routine of FIG. 6. If desired, due to non-linearity of the characteristics of the sensor, the value of the increment may be stored in a further table in non-volatile memory as a function of the base value A, to insure that the increments of adjustment correspond to 15 degree increments in a satisfactory manner.

While the invention has been described specifically with reference to an oven, it is apparent that the concept thereof is equally adaptable to gas heated ovens, in which case suitable conventional gas control devices are employed in place of the relays. It is further apparent that the concepts in accordance with the invention may equally well be employed for the control of other devices than ovens.

While the invention has been disclosed and described with reference to a single embodiment thereof, it is apparent that variations and modifications may be made therein, and it is therefore intended in the following claims to cover each such variation and modification as follows within the true spirit and scope of the invention.

What is claimed is:

1. In a control system comprising condition responsive means, control terminals, and control means coupled to said condition responsive means and control terminals and responsive to said sensing means for controlling the application of control signals to said terminals, the control means including means storing a first value corresponding to a given condition to which said sensing means is to be subjected; the improvement wherein said storing means comprising a non-volatile memory storing a digital number corresponding to said first value, and said control means further comprises a programmable non-volatile memory having stored therein a digital calibration value, means for varying said digital calibration value, means for converting the output of said condition responsive means to digital form, means for comparing the output of said converting means with a digital value representing a function of said digital number and said calibration value, and means for applying said control signals to said terminals only when the condition responsive means senses a value that differs from said function in a given sense.

2. In an oven comprising a source of heat, a temperature sensing means having an analog output, and control means coupled to said sensing means and source and responsive to said sensing means for controlling the operation of said source of heat, the control means including means storing a first value corresponding to a given temperature to which said source is to be heated; the improvement wherein said storing means comprises a non-volatile memory storing a digital number corresponding to said first value, said control means further comprising analog to digital converting means for converting the output of said sensing means to digital form, a programmable non-volatile memory having stored therein a digital calibration value, means for varying said calibration value, means for comparing the output of said converting means with a value representing a function of said digital number and said calibration value, and means for energizing said source only when the temperature thereof is less than a value corresponding to said function.

3. The control system of claim 2 wherein said system further comprises a display device and an input device, said system comprising means responsive to a determined input from said input device for displaying said calibration value on said display device.

4. The control system of claim 2 wherein said system further comprises an input device and a display device, said system comprising means responsive to a determined input from said input device for presenting an instructional display on said display device, said means for varying comprising means responsive to the completion of said instructional display and a further determined input from said input device for modifying said calibration value stored in said non-volatile memory.

5. The control system of claim 4 wherein said instructional display is a scanning display, 6. In an oven comprising a source of heat, a temperature sensing means, and control means coupled to said sensing means and source and responsive to said sensing means for controlling the operation of said source of heat, the control means including means storing a first value corresponding to a given temperature to which said source is to be heated; the improvement wherein said storing means comprises means for storing a digital value corresponding to said first value, and said control means further comprises a programmable non-volatile memory having stored therein a digital calibration value, means for converting the output of said sensing means to digital form and for comparing the said digital output form with a digital value representing a function of said first value and said calibration value, and means for energizing said source only when the temperature thereof is less than a value corresponding to said function.

7. The oven of claim 6 wherein said calibration value comprises a value corresponding to a predetermined incremental change in temperature, and a multiplier therefor, and said means for varying comprises means for modifying said multiplier.

8. The oven of claim 6 further comprising a display device, a control panel having a plurality of input switching means, and means responsive to the operation of a determined switching means for displaying said calibration value on said display device.

9. The oven of claim 8 wherein said switching means comprises a plurality of Keypads and said responsive means comprises means responsive to the depression of a determined one of said Keypads for a time exceeding a given time for displaying said calibration value.

10. The oven of claim 6 further comprising a display device, a control panel having a plurality of input switching means, said varying means comprising means responsive to the operation of a determined switching means in a determined manner for changing the value of said calibration value as stored in said non-volatile memory.

11. The oven of claim 10 wherein said switching means comprises a plurality of Keypads, and said responsive means comprises means responsive to the depression of a first determined keypad for increasing the value of said calibration value stored in said non-volatile memory, and means responsive to the depression of a second determined keypad for decreasing the value of said calibration value stored in said non-volatile memory.

12. The oven of claim 11 wherein said responsive means comprises means responsive to the depression of given Keypads for a time greater than a determined time for enabling said first and second Keypads to effect the change of the stored value of said calibration value.

13. The oven of claim 12 wherein said means responsive comprises means responsive to the depression of said given keypad for a time greater than said determined time for displaying an instructional message on said display device, and for enabling said first and second determined Keypads to effect a change of the stored calibration value only after the completion of said message.

14. In an oven comprising a source of heat, a temperature sensing means, and control means coupled to said sensing means and source and responsive to said sensing means for controlling the operation of said source of heat, the control means including means storing a first value corresponding to a temperature to which said source is to be heated, and comparing means responsive to said sensing means and value for energizing said source to maintain said source at the temperature to which said value corresponds; the improvement wherein storing means comprises non-volatile memory means for storing a digital base value representing said given temperature, non-volatile memory means storing a predetermined temperature increment, and non-volatile programmable memory means for storing a digital incremental value, said first value being dependent on said base value, said temperature increment and said incremental value in accordance with a determined relationship.

15. The oven of claim 14 further comprising manually controllable input means for modifying said incremental value.

16. The oven of claim 14 wherein said first value is the sum of said base value and the product of said increment and incremental value.

17. In a control arrangement for an oven including sensing means for sensing oven temperature, means for storing a value related to a temperature to which the oven is to be heated, and comparing means for comparing the output of said sensing means with said value for controlling said oven, the improvement wherein said storing means comprises non-volatile memory means storing a first variable digital value corresponding to said temperature, a fixed digital value corresponding to a fixed predetermined increment of temperature, and a variable incremental digital value, said comparing means comprising means for comparing the output of said sensing means with a value dependent upon said first value, fixed value and incremental value, in accordance with a determined relationship, for controlling said oven, and further comprising means for varying said incremental value stored in said non-volatile memory means.

* * * * *